(12) United States Patent
Suzuki

(10) Patent No.: US 7,317,985 B2
(45) Date of Patent: Jan. 8, 2008

(54) MOTOR VEHICLE AND CONTROL METHOD OF MOTOR VEHICLE

(75) Inventor: Masaki Suzuki, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 11/667,271

(22) PCT Filed: Nov. 24, 2005

(86) PCT No.: PCT/JP2005/022040

§ 371 (c)(1),
(2), (4) Date: May 8, 2007

(87) PCT Pub. No.: WO2006/057433

PCT Pub. Date: Jun. 1, 2006

(65) Prior Publication Data

US 2007/0265762 A1 Nov. 15, 2007

(30) Foreign Application Priority Data

Nov. 25, 2004 (JP) .............................. 2004-340750

(51) Int. Cl.
*G06F 19/00* (2006.01)
*F02D 41/00* (2006.01)

(52) U.S. Cl. ................ 701/113; 123/339.18; 123/142.5

(58) Field of Classification Search ................ 701/101, 701/112, 113, 114, 116; 123/339.18, 339.22, 123/339.24, 142.5 R, 142.5 E See application file for complete search history.

(56) References Cited

U.S. PATENT DOCUMENTS

| 5,228,305 | A | * | 7/1993 | Vogt ............................. 62/133 |
| 6,213,233 | B1 | * | 4/2001 | Sonntag et al. ............. 180/65.2 |
| 6,421,599 | B1 | | 7/2002 | Lippa et al. |
| 6,899,162 | B2 | * | 5/2005 | Hohl et al. .................... 165/41 |
| 2004/0050544 | A1 | * | 3/2004 | Hohl et al. .................. 165/202 |
| 2004/0255586 | A1 | * | 12/2004 | Hamada et al. ............... 60/670 |

FOREIGN PATENT DOCUMENTS

| DE | 198 01 167 C1 | 4/1999 |
| EP | 0 570 240 A1 | 11/1993 |
| EP | 0 917 976 A2 | 5/1999 |
| EP | 0 949 095 A1 | 10/1999 |
| JP | 09-233601 A | 9/1997 |
| JP | 11-245657 A | 9/1999 |
| JP | 2001-341515 A | 12/2001 |
| JP | 2004-224133 A | 8/2004 |

* cited by examiner

*Primary Examiner*—John T. Kwon
(74) *Attorney, Agent, or Firm*—Kenyon & Kenyon LLP

(57) ABSTRACT

When a vehicle power demand is less than a threshold value, which is set to or around a lower limit of a relatively efficient drive range of an engine and when an engine drive demand is set ON because of requirement for heating by an air conditioning system, the drive control of the invention sets the threshold value to an engine power demand and sets a higher level than a standard level to a maximum SOC (state of charge) of a battery. This drive control starts load operation of the engine with charge of the battery. The load operation of the engine desirably improves the fuel consumption of the vehicle, compared with independent operation of the engine.

15 Claims, 6 Drawing Sheets

MOTOR VEHICLE AND CONTROL METHOD OF MOTOR VEHICLE

This is a 371 national phase application of PCT/JP2005/022040 filed 24 Nov. 2005, which claims priority to Japanese Patent Application No. 2004-340750 filed 25 Nov. 2004, the contents of which are incorporated herein by reference.

TECHNICAL FIELD

The present invention relates to a motor vehicle and a control method of the motor vehicle.

BACKGROUND ART

A proposed motor vehicle sets permission and prohibition for an idle stop of an engine, based on the outside air temperature and the air blow temperature at an air outlet for heating located in a passenger compartment of the vehicle (see, for example, Japanese Patent Laid-Open Gazette No. 2001-341515). This proposed motor vehicle prohibits the idle stop of the engine when the outside air temperature is lower than a preset first temperature or when the air blow temperature at the air outlet is not lower than a preset second temperature. Such prohibition ensures exertion of the sufficient heating performances of an air conditioning system mounted on the motor vehicle.

DISCLOSURE OF THE INVENTION

The prior art motor vehicle prohibits the idle stop of the engine with requirement for heating the passenger compartment by the air conditioning system, so as to ensure the sufficient heating performances of the air conditioning system. The continued operation of the engine, however, undesirably lowers the fuel consumption of the vehicle. In a hybrid vehicle equipped with a driving motor in addition to an engine as the power source, in a motor drive mode immediately after a start of the vehicle in the cold state, the low battery temperature may interfere with exertion of the sufficient performances of the battery. In the motor drive mode immediately after the start of the vehicle in the cold state, the low motor temperature may also interfere with exertion of the sufficient performances of the motor.

The motor vehicle of the invention and the control method of the motor vehicle thus aim to improve the fuel consumption of the vehicle even under the continued operation of an internal combustion engine with requirement for heating a passenger compartment of the vehicle by an air conditioning system. The motor vehicle of the invention and the control method of the motor vehicle also aim to rapidly warm up an accumulator, for example, a secondary battery, and a motor immediately after a start of the vehicle in the cold state.

In order to attain at least part of the above and the other related objects, the motor vehicle of the invention and the control method of the motor vehicle have the configurations discussed below.

The present invention is directed to a motor vehicle. The motor vehicle includes: an internal combustion engine that outputs driving power used for driving the motor vehicle; a generator that consumes the output power of the internal combustion engine and generates electric power; an accumulator that is chargeable with the electric power generated by the generator; a heating system that heats a passenger compartment of the motor vehicle with the internal combustion engine as a heat source and sets on and off a heating drive request as a drive request of the internal combustion engine, based on satisfaction and failure of a preset condition; and a control device including a power drive request setting module and a control module. The power drive request setting module sets on and off a power drive request as another drive request of the internal combustion engine based on a preset vehicle power demand including the driving power. In a power drive request state where the power drive request is set on by the power drive request setting module. The control module controls the internal combustion engine and the generator to make the internal combustion engine output a power corresponding to the preset vehicle power demand. In a heating drive request state where the power drive request is set off by said power drive request setting module but the heating drive request is set on by the heating system. The control module controls the internal combustion engine and the generator to start load operation of the internal combustion engine. In a non-request state where both the power drive request and the heating drive request are set off by said power drive request setting module and by the heating system, the control module controls the internal combustion engine and the generator to stop operation of the internal combustion engine.

In the motor vehicle of the invention, the internal combustion engine outputs the driving power used for driving the motor vehicle, and the generator consumes the output power of the internal combustion engine and generates electric power. The heating system heats the passenger compartment of the motor vehicle with the internal combustion engine as the heat source. In the power drive request state where the power drive request is set on as a drive request of the internal combustion engine to satisfy the preset vehicle power demand including the driving power, the motor vehicle of the invention controls the internal combustion engine and the generator to make the internal combustion engine output a power corresponding to the preset vehicle power demand. This control enables the internal combustion engine to output the power corresponding to the preset vehicle power demand. In the heating drive request state where the power drive request is set off but the heating drive request is set on as another drive request of the internal combustion engine by the heating system, the motor vehicle of the invention controls the internal combustion engine and the generator to start the load operation of the internal combustion engine. The load operation of the internal combustion engine desirably improves the fuel consumption of the vehicle, compared with simple independent operation (for example, idle operation) of the internal combustion engine. Immediately after a start of the vehicle in the cold state, the load operation of the internal combustion engine rapidly warms up the accumulator. This control enables a quick temperature rise of the accumulator and thereby ensures exertion of the sufficient performances of the accumulator. In the non-request state where both the power drive request and the heating drive request are set off, the motor vehicle of the invention controls the internal combustion engine and the generator to stop the operation of the internal combustion engine. This control leads to further improvement in fuel consumption of the vehicle.

In the motor vehicle of the invention, it is preferable that the control module controls the internal combustion engine and the generator to charge the accumulator simultaneously with the load operation of the internal combustion engine in the heating drive request state. It is also preferable that the control module increases a charge demand of the accumulator to start the load operation of the internal combustion engine in the heating drive request state. The electric power charged and accumulated in the accumulator is discharged according to the later requirement. The load operation of the internal combustion engine under this condition further improves the fuel consumption of the vehicle, compared with the simple independent operation of the internal combustion engine.

In the motor vehicle of the invention, it is preferable that the control module controls the internal combustion engine and the generator to charge the accumulator to a preset first charge level as an upper limit in the power drive request state and in the non-request state, while controlling the internal combustion engine and the generator to charge the accumulator to a higher charge level than the preset first charge level as the upper limit in the heating drive request state. This arrangement enables a greater amount of electric power to be charged into the accumulator.

In one preferable embodiment of the invention, the motor vehicle further includes a motor that outputs driving power used for driving the motor vehicle. The accumulator is dischargeable to supply electric power to the motor. The control module controls the internal combustion engine, the motor, and the generator to make the internal combustion engine output the power corresponding to the preset vehicle power demand and to ensure output of the driving power in the power drive request state. The control module controls the internal combustion engine, the motor, and the generator to start the load operation of the internal combustion engine and to ensure output of the driving power in the heating drive request state. The control module controls the internal combustion engine, the motor, and the generator to stop the operation of the internal combustion engine and to ensure output of the driving power in the non-request state. This arrangement ensures output of the driving power in any state. The load operation of the internal combustion engine in the heating drive request state enables a quick temperature rise of the motor immediately after a start of the vehicle in the cold state and thereby ensures exertion of the sufficient performances of the motor.

In the motor vehicle of the invention equipped with the motor, it is preferable that the control module controls the internal combustion engine, the motor, and the generator to cause at least part of the output power of the internal combustion engine under the load operation in the heating drive request state to be used as the driving power. This arrangement enables the output power of the internal combustion engine to be used as the driving power, as well as to be used for charging the accumulator.

In the motor vehicle of the invention equipped with the motor, it is preferable that the control module controls the internal combustion engine, the motor, and the generator to charge the accumulator simultaneously with the load operation of the internal combustion engine in the heating drive request state. It is also preferable that the control module increases a charge demand of the accumulator to start the load operation of the internal combustion engine in the heating drive request state. Further, it is preferable that the control module controls the internal combustion engine, the motor, and the generator to charge the accumulator to a preset first charge level as an upper limit in the power drive request state and in the non-request state, while controlling the internal combustion engine, the motor, and the generator to charge the accumulator to a higher charge level than the preset first charge level as the upper limit in the heating drive request state.

Further, in the motor vehicle of the invention equipped with the motor, it is preferable that the motor vehicle further includes: a three shaft-type power input output mechanism that is linked to three shafts, that is, an output shaft of the internal combustion engine, a drive shaft connecting with an axle of said motor vehicle, and a rotating shaft of the generator, and automatically inputs and outputs power from and to a residual one shaft based on powers input from and output to any two shafts among the three shafts. In this case, the motor may be linked to output the power to the axle connecting with the drive shaft or to another axle of the motor vehicle.

In the motor vehicle of the invention equipped with the motor, it is preferable that the generator is a pair-rotor generator that has a first rotor linked to an output shaft of the internal combustion engine and a second rotor linked to a drive shaft connecting with an axle of the motor vehicle and is driven to rotate through relative rotation of the first rotor to the second rotor. In this case, the motor may be linked to output the power to the axle connecting with the drive shaft or to another axle of the motor vehicle.

The present invention is also directed to a first control method of a motor vehicle. The motor vehicle includes: an internal combustion engine that outputs driving power used for driving the motor vehicle; a generator that consumes the output power of the internal combustion engine and generates electric power; an accumulator that is chargeable with the electric power generated by the generator; and a heating system that heats a passenger compartment of said motor vehicle with the internal combustion engine as a heat source. In the presence of a drive request of the internal combustion engine to satisfy a preset vehicle power demand including the driving power, the first control method of the invention controls the internal combustion engine and the generator to make the internal combustion engine output a power corresponding to the preset vehicle power demand. In the absence of the drive request of the internal combustion engine to satisfy the preset vehicle power demand but in the presence of a drive request of the internal combustion engine to activate the heating system for heating the passenger compartment of the motor vehicle, the first control method of the invention controls the internal combustion engine and the generator to start load operation of the internal combustion engine. In the absence of the drive request of the internal combustion engine to satisfy the preset vehicle power demand and in the absence of the drive request of the internal combustion engine to activate the heating system for heating the passenger compartment of the motor vehicle, the first control method of the invention controls the internal combustion engine and the generator to stop operation of the internal combustion engine.

In the first control method of the invention, the internal combustion engine outputs the driving power used for driving the motor vehicle, and the generator consumes the output power of the internal combustion engine and generates electric power. The heating system heats the passenger compartment of the motor vehicle with the internal combustion engine as the heat source. In the presence of the drive request of the internal combustion engine to satisfy the preset vehicle power demand including the driving power, the first control method of the invention controls the internal combustion engine and the generator to make the internal combustion engine output a power corresponding to the preset vehicle power demand. This control enables the internal combustion engine to output the power corresponding to the preset vehicle power demand. In the absence of the drive request of the internal combustion engine to satisfy the preset vehicle power demand but in the presence of the drive request of the internal combustion engine to activate the heating system for heating the passenger compartment of the motor vehicle, the first control method of the invention controls the internal combustion engine and the generator to start the load operation of the internal combustion engine. The load operation of the internal combustion engine desirably improves the fuel consumption of the vehicle, compared with simple independent operation (for example, idle operation) of the internal combustion engine. Immediately after a start of the vehicle in the cold state, the load operation of the internal combustion engine rapidly warms up the accumulator. This control enables a quick temperature rise of the accumulator and thereby ensures exertion of the sufficient performances of the accumulator. In the absence of the drive request of the internal combustion engine to satisfy the preset vehicle power demand and in the absence of the drive request of the internal combustion engine to activate the heating system for heating the passenger compartment of the motor vehicle, the first control method of the invention controls the internal combustion engine and the generator to stop the operation of the internal combustion engine. This control leads to further improvement in fuel consumption of the vehicle.

The present invention is also directed to a second control method of a motor vehicle. The motor vehicle includes: an internal combustion engine that outputs driving power used for driving the motor vehicle; a generator that consumes the output power of the internal combustion engine and generates electric power; a motor that outputs driving power used for driving said motor vehicle; an accumulator that is chargeable with the electric power generated by the generator and is dischargeable to supply electric power to the motor; and a heating system that heats a passenger compartment of the motor vehicle with the internal combustion engine as a heat source. In the presence of a drive request of the internal combustion engine to satisfy a preset vehicle power demand including the driving power, the second control method controls the internal combustion engine, the motor, and the generator to make the internal combustion engine output a power corresponding to the preset vehicle power demand and to ensure output of the driving power. In the absence of the drive request of the internal combustion engine to satisfy the preset vehicle power demand but in the presence of a drive request of the internal combustion engine to activate the heating system for heating the passenger compartment of the motor vehicle, the second control method controls the internal combustion engine, the motor, and the generator to start load operation of the internal combustion engine and to ensure output of the driving power. In the absence of the drive request of the internal combustion engine to satisfy the preset vehicle power demand and in the absence of the drive request of the internal combustion engine to activate the heating system for heating the passenger compartment of the motor vehicle, the second control method controls the internal combustion engine, the motor, and the generator to stop operation of the internal combustion engine and to ensure output of the driving power.

In the second control method of the invention, the internal combustion engine outputs the driving power used for driving the motor vehicle, the motor outputs driving power used for driving the motor vehicle, and the generator consumes the output power of the internal combustion engine and generates electric power. The heating system heats the passenger compartment of the motor vehicle with the internal combustion engine as the heat source. In the presence of the drive request of the internal combustion engine to satisfy the preset vehicle power demand including the driving power, the second control method of the invention controls the internal combustion engine, the motor, and the generator to make the internal combustion engine output a power corresponding to the preset vehicle power demand and a driving power used for driving the motor vehicle. This control enables the internal combustion engine to output the power corresponding to the preset vehicle power demand. In the absence of the drive request of the internal combustion engine to satisfy the preset vehicle power demand but in the presence of the drive request of the internal combustion engine to activate the heating system for heating the passenger compartment of the motor vehicle, the second control method of the invention controls the internal combustion engine, the motor, and the generator to start the load operation of the internal combustion engine and to output the driving power used for driving the motor vehicle. The load operation of the internal combustion engine desirably improves the fuel consumption of the vehicle, compared with simple independent operation (for example, idle operation) of the internal combustion engine. Immediately after a start of the vehicle in the cold state, the load operation of the internal combustion engine rapidly warms up the accumulator. This control enables a quick temperature rise of the accumulator and thereby ensures exertion of the sufficient performances of the accumulator. In the absence of the drive request of the internal combustion engine to satisfy the preset vehicle power demand and in the absence of the drive request of the internal combustion engine to activate the heating system for heating the passenger compartment of the motor vehicle, the second control method of the invention controls the internal combustion engine, the motor, and the generator to stop the operation of the internal combustion engine and to output driving power used for driving the motor vehicle. This control leads to further improvement in fuel consumption of the vehicle.

BEST MODES OF CARRYING OUT THE INVENTION

Figure 1:
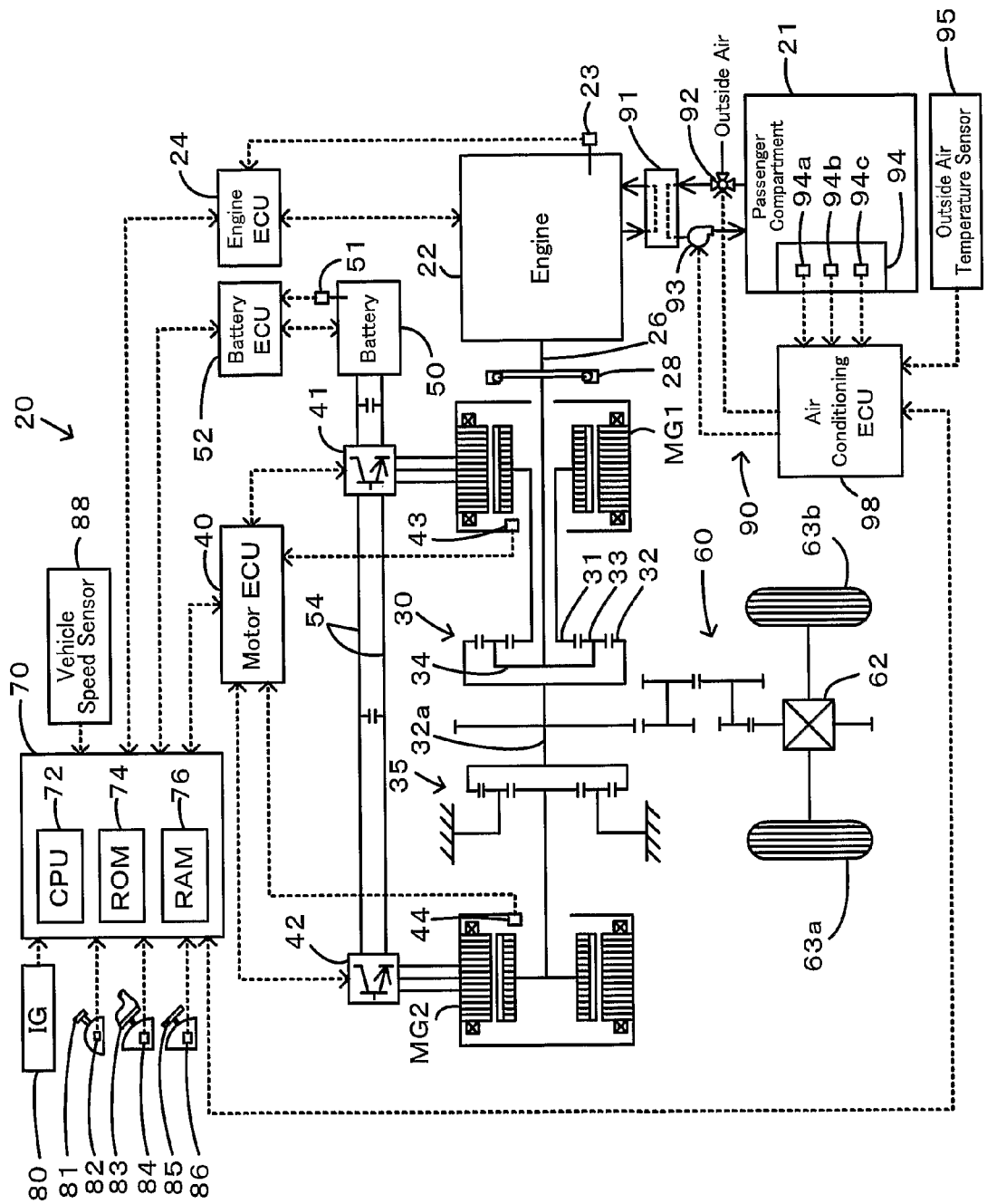
FIG. 1 schematically illustrates the configuration of a hybrid vehicle in one embodiment of the invention.

One mode of carrying out the invention is discussed below as a preferred embodiment. FIG. 1 schematically illustrates the configuration of a hybrid vehicle 20 in one embodiment of the invention. As illustrated, the hybrid vehicle 20 of the embodiment includes an engine 22, a three shaft-type power distribution integration mechanism 30 that is linked to a crankshaft 26 or an output shaft of the engine 22 via a damper 28, a motor MG1 that is connected to the power distribution integration mechanism 30 and is capable of generating electric power, a reduction gear 35 that is attached to a ring gear shaft 32a or a drive shaft connecting with the power distribution integration mechanism 30, a motor MG2 that is linked to the reduction gear 35, an air conditioning system 90 that is activated for air conditioning in a passenger compartment 21, and a hybrid electronic control unit 70 that controls the whole drive system of the hybrid vehicle 20.

The engine 22 is an internal combustion engine that consumes a hydrocarbon fuel, such as gasoline or light oil, to output power. An engine electronic control unit (hereafter referred to as engine ECU) 24 receives signals representing the driving conditions of the engine 22 from various sensors, for example, temperature Tw of cooling water circulated in the engine 22 (cooling water temperature Tw) measured by a cooling water temperature sensor 23, and controls the operations of the engine 22 to implement, for example, fuel injection control, ignition control, and intake air flow regulation. The engine ECU 24 establishes communication with the hybrid electronic control unit 70 to drive and control the engine 22 in response to control signals received from the hybrid electronic control unit 70, while sending data regarding the driving conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 connect the inverters 41 and 42 with the battery 50. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50. The battery ECU 52 also calculates an input limit Win and an output limit Wout of the battery 50, based on the state of charge (SOC) and the battery temperature Tb.

The air conditioning system 90 includes a heat exchanger 91 that is located in the cooling system of the engine 22 for heat exchange with cooling water, a blower 93 that takes the outside air or the inside air of the passenger compartment 21 into the heat exchanger 91 and sends the hot air heated through the heat exchange by the heat exchanger 91 into the passenger compartment 21, a switch over mechanism 92 that switches over the air intake source of the blower 93 between the outside air and the inside air of the passenger compartment 21, an operation panel 94 that is placed in the passenger compartment 21, and an air conditioning electronic control unit (air conditioning ECU) 98 that controls the operations of the whole air conditioning system 90. The air conditioning ECU 98 receives various input signals required for control, for example, a blower switch signal BSW representing heater on/off from a blower switch 94a mounted on the operation panel 94, a setting temperature T* as a set temperature in the passenger compartment 21 from a setting temperature switch 94b mounted on the operation panel 94, a passenger compartment temperature Tin as the measured internal temperature of the passenger compartment 21 from a temperature sensor 94c mounted on the operation panel 94, and an outside air temperature Tout as the measured temperature of the outside air from an outside air temperature sensor 95 attached to the outside of the passenger compartment 21. The air conditioning ECU 98 drives and controls the blower 93 in response to these input signals to make the measured passenger compartment temperature Tin approach to the setting temperature T*, and sets a drive request EG* of the engine 22 based on the measured cooling water temperature Tw. The drive request EG* of the engine 22 may be set by any of diverse techniques. One applicable technique sets the engine drive request EG* ON under the cooling water temperature Tw of lower than a preset first reference temperature, for example, 60° C., and sets the engine drive request EG* OFF under the cooling water temperature Tw of not lower than a preset second reference temperature, for example, 80° C. The air conditioning ECU 98 establishes communication with the hybrid electronic control unit 70 to send the set engine drive request EG* and data representing the current conditions of the air conditioning system 90 to the hybrid electronic control unit 70 according to the requirements.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

Figure 2:
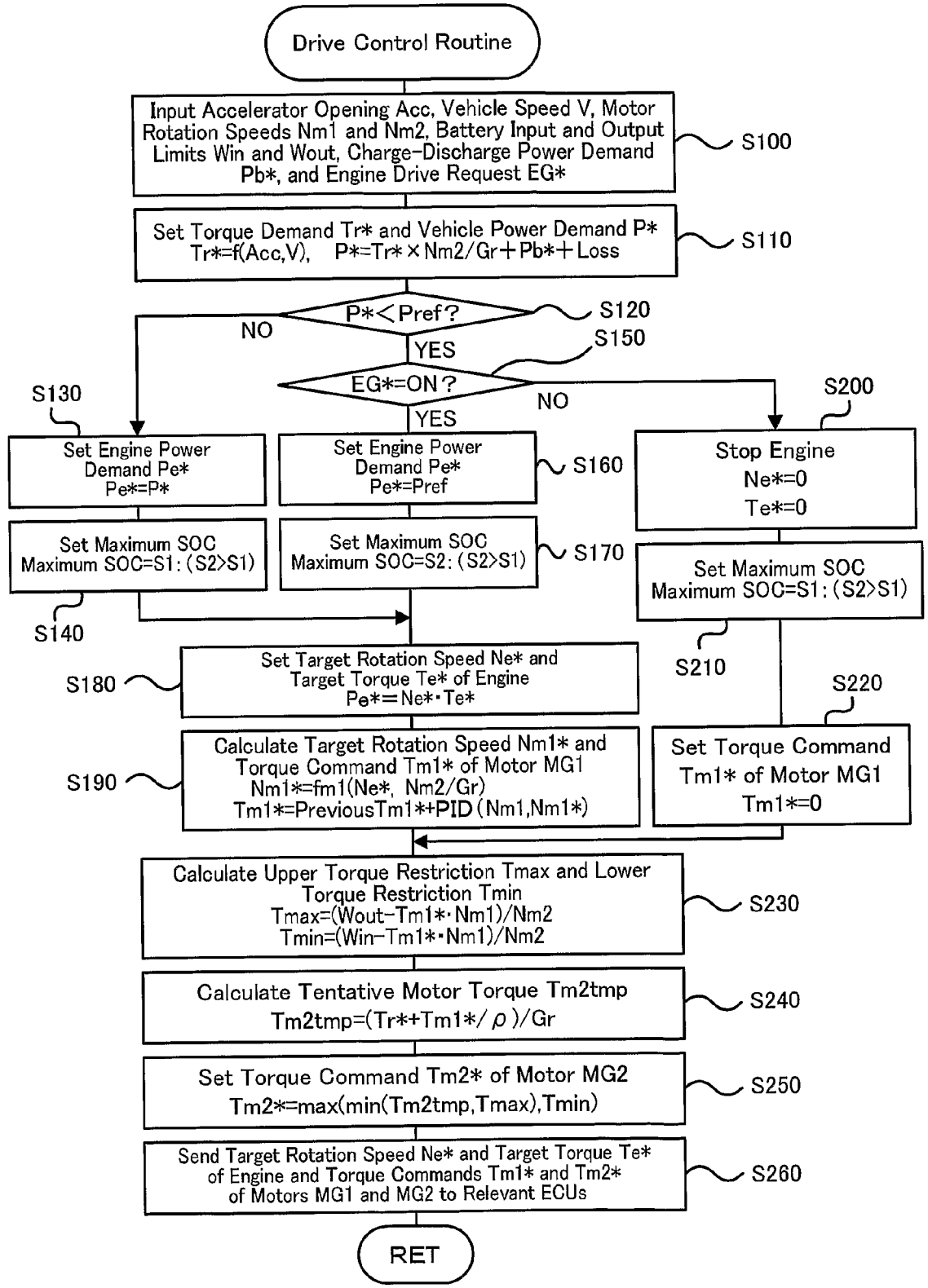
FIG. 2 is a flowchart showing a drive control routine executed by a hybrid electronic control unit included in the hybrid vehicle of the embodiment.

The description regards the operations of the hybrid vehicle 20 of the embodiment constructed as discussed above, especially a series of drive control in response to the ON/OFF setting of the engine drive request EG* by the air conditioning system 90. FIG. 2 is a flowchart showing a drive control routine executed by the hybrid electronic control unit 70 in the hybrid vehicle 20 of the embodiment. This drive control routine is carried out repeatedly at preset time intervals, for example, at every several msec.

In the drive control routine, the CPU 72 of the hybrid electronic control unit 70 first inputs various data required for control, that is, the accelerator opening Acc from the accelerator pedal position sensor 84, the vehicle speed V from the vehicle speed sensor 88, rotation speeds Nm1 and Nm2 of the motors MG1 and MG2, an input limit Win and an output limit Wout of the battery 50, a charge-discharge power demand Pb* of the battery 50, and the engine drive request EG* (step S100). The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. The input limit Win and the output limit Wout of the battery 50 are set based on the measured temperature Tb of the battery 50 by the temperature sensor 51 and the observed state of charge SOC of the battery 50 and are received from the battery ECU 52 by communication. The charge-discharge power demand Pb* of the battery 50 is set corresponding to a difference between the observed state of charge SOC and a target state of charge SOC* of the battery 50 and is received from the battery ECU 52 by communication.

Figure 3:
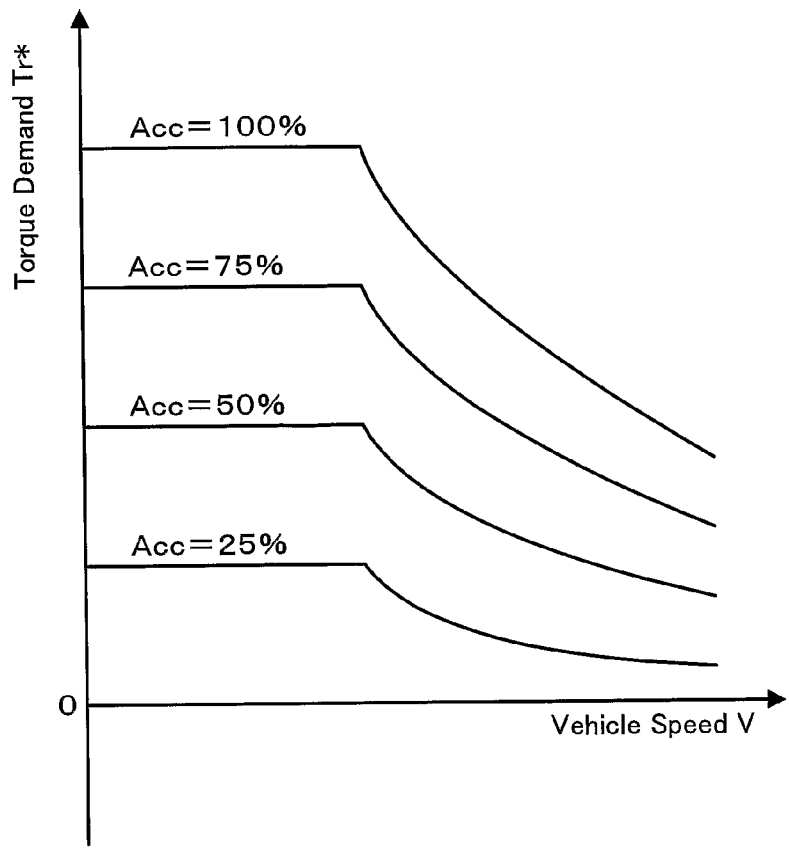
FIG. 3 shows one example of a torque demand setting map.

After the data input, the CPU 72 sets a torque demand Tr* to be output to the ring gear shaft 32a or the drive shaft linked to the drive wheels 63a and 63b as the torque required for the vehicle and a vehicle power demand P* required to drive the hybrid vehicle 20, based on the input accelerator opening Acc and the input vehicle speed V (step S110). A concrete procedure of setting the torque demand Tr* in this embodiment stores in advance variations in torque demand Tr* against the accelerator opening Acc and the vehicle speed V as a torque demand setting map in the ROM 74 and reads the torque demand Tr* corresponding to the given accelerator opening Acc and the given vehicle speed V from this torque demand setting map. One example of the torque demand setting map is shown in FIG. 3. The vehicle power demand P* is calculated as the sum of the product of the torque demand Tr* and a rotation speed Nr of the ring gear shaft 32a, the charge-discharge power demand Pb* of the battery 50, and a potential loss. The rotation speed Nr of the ring gear shaft 32a is obtained by multiplying the vehicle speed V by a preset conversion factor k or by dividing the rotation speed Nm2 of the motor MG2 by a gear ratio Gr of the reduction gear 35.

The vehicle power demand P* is compared with a predetermined threshold value Pref (step S120). The threshold value Pref is used as a criterion for determining whether the operation of the engine 22 is required to satisfy the vehicle power demand P*, and is set to or around a lower limit of efficient drive of the engine 22 in this embodiment. When the vehicle power demand P* is not less than the predetermined threshold value Pref at step S120, the CPU 72 determines the requirement of the operation of the engine 22 to satisfy the vehicle power demand P* and sets the vehicle power demand P* to an engine power demand Pe* (step S130) and sets a standard level S1, for example, 80%, to a maximum SOC as an upper limit of the state of charge SOC of the battery 50 (step S140). The hybrid electronic control unit 70 sends the maximum SOC to the battery ECU 52. The battery ECU 52 sets the charge-discharge power demand Pb* to limit the state of charge SOC of the battery 50 within the received maximum SOC.

Figure 4:
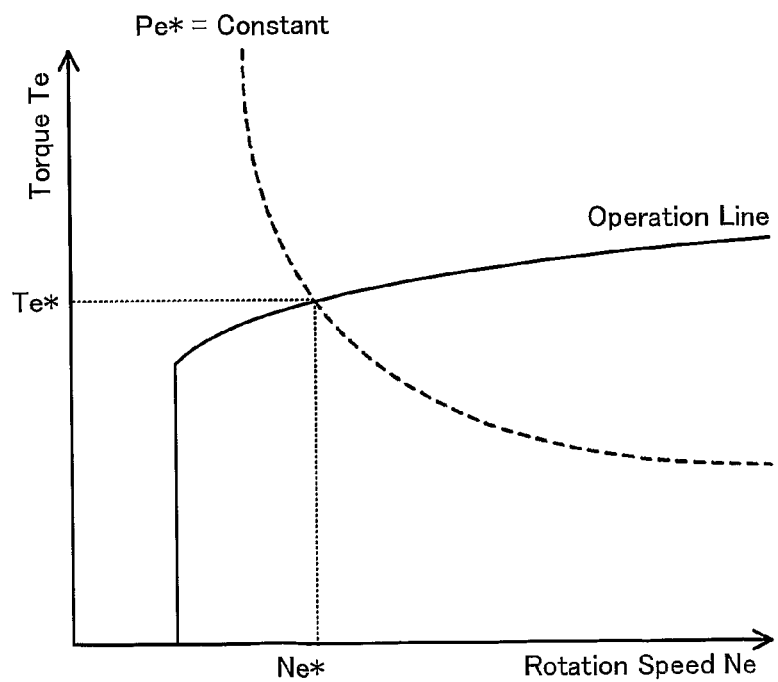
FIG. 4 shows an efficient operation line of an engine to set a target rotation speed Ne* and a target torque Te*.

The CPU 72 subsequently sets a target rotation speed Ne* and a target torque Te* of the engine 22 corresponding to the engine power demand Pe* (step S180). The target rotation speed Ne* and the target torque Te* of the engine 22 are determined according to an efficient operation line of ensuring efficient operations of the engine 22 and the engine power demand Pe*. FIG. 4 shows an efficient operation line of the engine 22 to set the target rotation speed Ne* and the target torque Te*. The target rotation speed Ne* and the target torque Te* are given at an intersection of the efficient operation line and a line of constant engine power demand Pe* (=Ne*×Te*).

The CPU 72 subsequently calculates a target rotation speed Nm1* of the motor MG1 from the target rotation speed Ne* of the engine 22, the rotation speed Nr (=Nm2/Gr) of the ring gear shaft 32a, and a gear ratio ρ of the power distribution integration mechanism 30 according to Equation (1) given below, while calculating a torque command Tm1* of the motor MG1 from the calculated target rotation speed Nm1* and the current rotation speed Nm1 of the motor MG1 according to Equation (2) given below (step S190):

$$Nm1^* = Ne^* \cdot (1+\rho)/\rho - Nm2/(Gr \cdot \rho) \tag{1}$$

$$Tm1^* = \text{Previous} Tm1^* + k1(Nm1^* - Nm1) + k2 \int (Nm1^* - Nm1) dt \tag{2}$$

Figure 5:
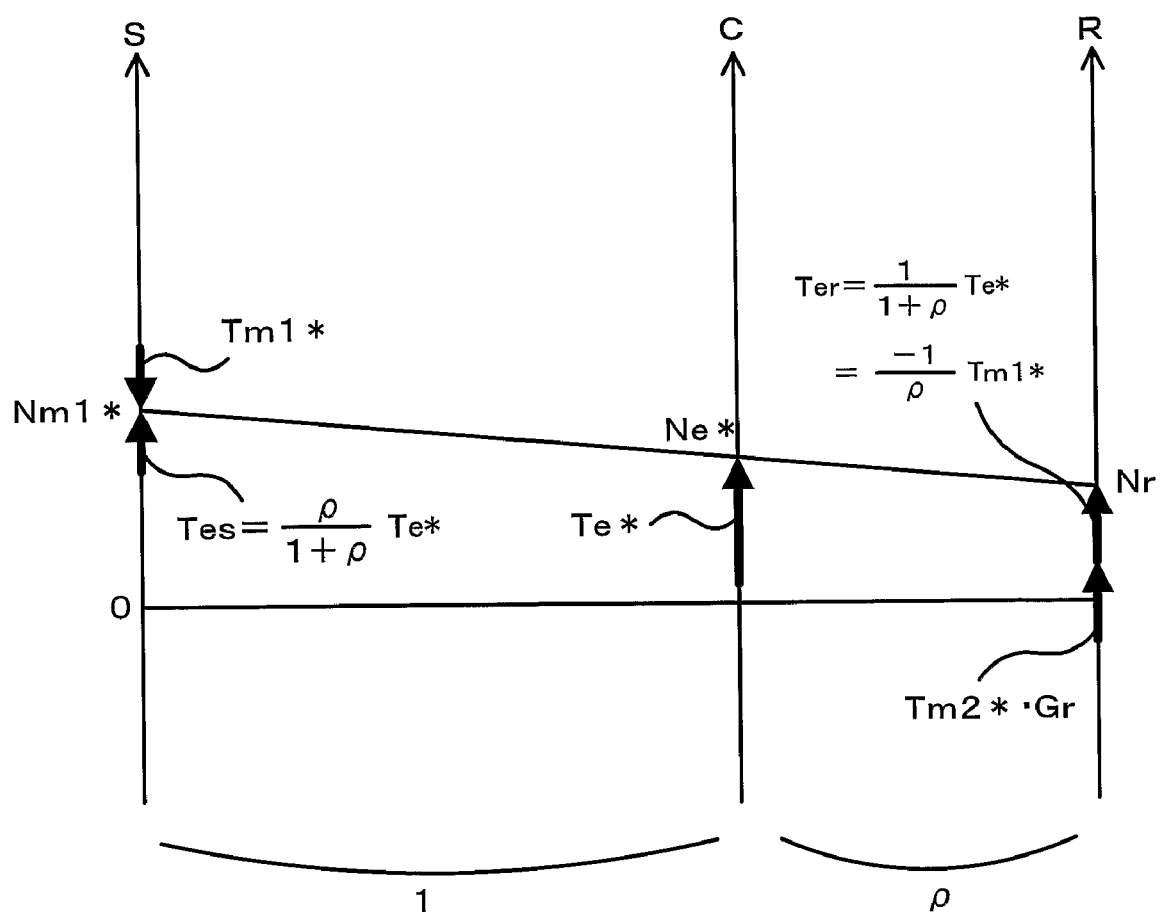
FIG. 5 is an alignment chart showing torque-rotation speed dynamics of respective rotational elements of a power distribution integration mechanism included in the hybrid vehicle of FIG. 1.

Equation (1) is a dynamic relational expression of the rotational elements included in the power distribution integration mechanism 30. FIG. 5 is an alignment chart showing torque-rotation speed dynamics of the respective rotational elements included in the power distribution integration mechanism 30. The left axis 'S' represents the rotation speed of the sun gear 31 that is equivalent to the rotation speed Nm1 of the motor MG1. The middle axis 'C' represents the rotation speed of the carrier 34 that is equivalent to the rotation speed Ne of the engine 22. The right axis 'R' represents the rotation speed Nr of the ring gear 32 (ring gear shaft 32a), which is obtained by multiplying the rotation speed Nm2 of the motor MG2 by the gear ratio Gr of the reduction gear 35. Equation (1) is readily introduced from this alignment chart of FIG. 5. Two thick arrows on the axis 'R' respectively show a torque that is transmitted to the ring gear shaft 32a when the torque Te* is output from the engine 22 in steady operation at a specific drive point of the target rotation speed Ne* and the target torque Te*, and a torque that is applied to the ring gear shaft 32a via the reduction gear 35 when a torque Tm2* is output from the motor MG2. Equation (2) is a relational expression of feedback control to drive and rotate the motor MG1 at the target rotation speed Nm1*. In Equation (2) given above, 'k1' in the second term and 'k2' in the third term on the right side respectively denote a gain of the proportional and a gain of the integral term.

After calculation of the target rotation speed Nm1* and the torque command Tm1* of the motor MG1, the CPU 72 calculates an upper torque restriction Tmax and a lower torque restriction Tmin as maximum and minimum torques output from the motor MG2 according to Equations (3) and (4) given below (step S230):

$$Tmax=(Wout-Tm1^* \cdot Nm1)/Nm2 \quad (3)$$

$$Tmin=(Win-Tm1^* \cdot Nm1)/Nm2 \quad (4)$$

The upper torque restriction Tmax is given by dividing a difference between the output limit Wout of the battery 50 and power consumption (power generation) of the motor MG1, which is the product of the torque command Tm1* and the current rotation speed Nm1 of the motor MG1, by the current rotation speed Nm2 of the motor MG2. Similarly the lower torque restriction Tmin is given by dividing a difference between the input limit Win of the battery 50 and the power consumption (power generation) of the motor MG1 by the current rotation speed Nm2 of the motor MG2. The CPU 72 then calculates a tentative motor torque Tm2tmp to be output from the motor MG2 from the torque demand Tr*, the torque command Tm1* of the motor MG1, the gear ratio ρ of the power distribution integration mechanism 30, and the gear ratio Gr of the reduction gear 35 according to Equation (5) given below (step S240):

$$Tm2tmp=(Tr^*+Tm1^*/\rho)/Gr \quad (5)$$

The CPU 72 limits the calculated tentative motor torque Tm2tmp to the range between the lower torque restriction Tmin and the upper torque restriction Tmax to set a torque command Tm2* of the motor MG2 (step S250). Setting the torque command Tm2* of the motor MG2 in this manner restricts the torque demand Tr* to be output to the ring gear shaft 32a or the drive shaft within the range between the input limit Win and the output limit Wout of the battery 50. Equation (5) is readily introduced from the alignment chart of FIG. 5.

The CPU 72 sends the target rotation speed Ne* and the target torque Te* of the engine 22 to the engine ECU 24 and the torque commands Tm1* and Tm2* of the motors MG1 and MG2 to the motor ECU 40 (step S260), and then exits from this drive control routine. In the operation state of the engine 22, in response to reception of the target rotation speed Ne* and the target torque Te*, the engine ECU 24 executes fuel injection control and ignition control to drive the engine 22 at the specified drive point of the target rotation speed Ne* and the target torque Te*. In the stop state of the engine 22, on the other hand, the engine ECU 24 executes fuel injection control and ignition control to start the engine 22 and drive the engine 22 at the specified drive point of the target rotation speed Ne* and the target torque Te*. The motor ECU 40 receives the torque commands Tm1* and Tm2* and executes switching control of the switching elements included in the respective inverters 41 and 42 to drive the motor MG1 with the torque command Tm1* and the motor MG2 with the torque command Tm2*.

When the vehicle power demand P* is less than the predetermined threshold value Pref at step S120, the CPU 72 checks the engine drive request EG* (step S150). In response to the OFF setting of the engine drive request EG*, the CPU 72 determines non-requirement of the operation of the engine 22 and sets a value '0' to both the target rotation speed Ne* and the target torque Te* to stop the engine 22 (step S200). The CPU 72 then sets the standard level S1 to the maximum SOC (state of charge) of the battery 50 (step S210) and sets a value '0' to the torque command Tm1* of the motor MG1 (step S220). The CPU 72 sets the torque command Tm2* of the motor MG2 based on the torque command Tm1* of the motor MG1 (steps S230 to S250), sends the target rotation speed Ne* and the target torque Te* of the engine 22 to the engine ECU 24 and the torque commands Tm1* and Tm2* of the motors MG1 and MG2 to the motor ECU 40 (step S260), and exits from this drive control routine. In the operation state of the engine 22, in response to reception of the target rotation speed Ne* and the target torque Te* set equal to 0, the engine ECU 24 executes fuel injection control and ignition control to stop the engine 22. In the stop state of the engine 22, on the other hand, the engine ECU 24 keeps the operation stop of the engine 22. The torque command Tm2* of the motor MG2 is basically set to the torque demand Tr*, since the torque command Tm1* of the motor MG1 is equal to 0.

When the vehicle power demand P* is less than the predetermined threshold value Pref at step S120 and the engine drive request EG* is ON at step S150, the CPU 72 determines the requirement of the operation of the engine 22 not for satisfaction of the vehicle power demand P* but for heating by the air conditioning system 90. The CPU 72 accordingly sets the predetermined threshold value Pref to the engine power demand Pe* (step S160) and sets a higher level S2 than the standard level S1, for example, 85%, to the maximum SOC (state of charge) of the battery 50 (step S170). Setting the threshold value Pref to the engine power demand Pe* enables relatively efficient load operation of the engine 22. Setting the higher level S2 than the standard level S1 to the maximum SOC enables the battery 50 to be charged to a higher charge level. The CPU 72 sets the target rotation speed Ne* and the target torque Te* of the engine 22 corresponding to the engine power demand Pe* (step S180) and calculates the torque command Tm1* of the motor MG1 from the target rotation speed Ne* of the engine 22 (step S190). The CPU 72 subsequently sets the torque command Tm2* of the motor MG2 based on the torque command Tm1* of the motor MG1 (steps S230 to S250), sends the target rotation speed Ne* and the target torque Te* of the engine 22 to the engine ECU 24 and the torque commands Tm1* and Tm2* of the motors MG1 and MG2 to the motor ECU 40 (step S260), and exits from this drive control routine. Like the flow under the condition of the vehicle power demand P* of not less than the predetermined threshold value Pref, in the operation state of the engine 22, in response to reception of the target rotation speed Ne* and the target torque Te*, the engine ECU 24 executes fuel injection control and ignition control to drive the engine 22 at the specified drive point of the target rotation speed Ne* and the target torque Te*. In the stop state of the engine 22, on the other hand, the engine ECU 24 executes fuel injection control and ignition control to start the engine 22 and drive the engine 22 at the specified drive point of the target rotation speed Ne* and the target torque Te*.

In the cold state, it is assumed that the charge-discharge power demand Pb* is equal to 0 and that the operation of the engine 22 is required not for satisfaction of the vehicle power demand P* but for heating by the air conditioning system 90. Namely it is assumed that the vehicle power demand P* is less than the predetermined threshold value Pref and that the engine drive request EG* is ON. In this state, the driving power demand (Tr*·Nm2/Gr) required for driving the hybrid vehicle 20 is less than the predetermined threshold value Pref, since the charge-discharge power demand Pb* is equal to 0. The output power of the engine 22 is greater than the driving power demand, since the threshold value Pref is set to the engine power demand Pe*. The electric power generated by the motor MG1 is accordingly higher than the electric power consumed by the motor MG2, and the battery 50 is charged with the surplus electric power. In this state, the higher level S2 than the standard level S1 is set to the maximum SOC of the battery 50, in order to enable a greater portion of the surplus electric power to be charged into the battery 50. When the operation of the engine 22 is required not for satisfaction of the vehicle power demand P* but for heating by the air conditioning system 90, the drive control of the embodiment starts the load operation of the engine 22 with charge of the battery 50. The electric power charged and accumulated in the battery 50 is discharged corresponding to the charge-discharge power demand Pb* under the condition of the high cooling water temperature Tw and is used as the driving power. The load operation of the engine 22 quickly warms up the engine 22 and enables the battery 50 to be rapidly heated up with the heat released from the engine 22. The drive control of the embodiment enables a quick temperature rise of the battery 50 immediately after a start of the vehicle in the cold state and thereby ensures exertion of the sufficient performances of the battery 50.

As described above, the hybrid vehicle 20 of the embodiment starts the load operation of the engine 22 with charge of the battery 50 when the operation of the engine 22 is required not for satisfaction of the vehicle power demand P* but for heating by the air conditioning system 90. The load operation of the engine 22 desirably improves the fuel consumption (energy efficiency) of the vehicle, compared with the independent operation (idle operation) of the engine 22. Setting the higher level S2 than the standard level S1 to the maximum SOC of the battery 50 enables a greater portion of the surplus electric power to be charged into the battery 50. This leads to further improvement in fuel consumption of the vehicle. The load operation of the engine 22 quickly warms up the engine 22 and enables the battery 50 to be rapidly heated up with the heat released from the engine 22. The drive control of the embodiment enables a quick temperature rise of the battery 50 immediately after a start of the vehicle in the cold state and thereby ensures exertion of the sufficient performances of the battery 50. The torque demand Tr* may be output to the ring gear shaft 32a or the drive shaft in the range of the input limit Win and the output limit Wout of the battery 50, regardless of the requirement or non-requirement of the operation of the engine 22 for satisfaction of the vehicle power demand P* or for heating by the air conditioning system 90.

When the operation of the engine 22 is required not for satisfaction of the vehicle power demand P* but for heating by the air conditioning system 90, the hybrid vehicle 20 of the embodiment sets the predetermined threshold value Pref to the engine power demand Pe* and starts the load operation of the engine 22. The engine 22 may perform the load operation under the setting of a larger value or a smaller value than the threshold value Pref to the engine power demand Pe*.

When the operation of the engine 22 is required not for satisfaction of the vehicle power demand P* but for heating by the air conditioning system 90, the hybrid vehicle 20 of the embodiment sets the predetermined threshold value Pref to the engine power demand Pe* and starts the load operation of the engine 22 with charge of the battery 50. One possible modification may reset the charge-discharge power demand Pb* to a large value for charging and start the load operation of the engine 22 with the increased vehicle power demand P* to or over the threshold value Pref. The charge-discharge power demand Pb* may be reset to any arbitrary value that ensures an increase of the vehicle power demand P* to or over the threshold value Pref.

When the operation of the engine 22 is required not for satisfaction of the vehicle power demand P* but for heating by the air conditioning system 90, the hybrid vehicle 20 of the embodiment sets the higher level S2 than the standard level S1 to the maximum SOC of the battery 50. The maximum SOC of the battery 50 may be kept at the standard level S1 even in the operation state of the engine 22 for heating by the air conditioning system 90.

Figure 6:
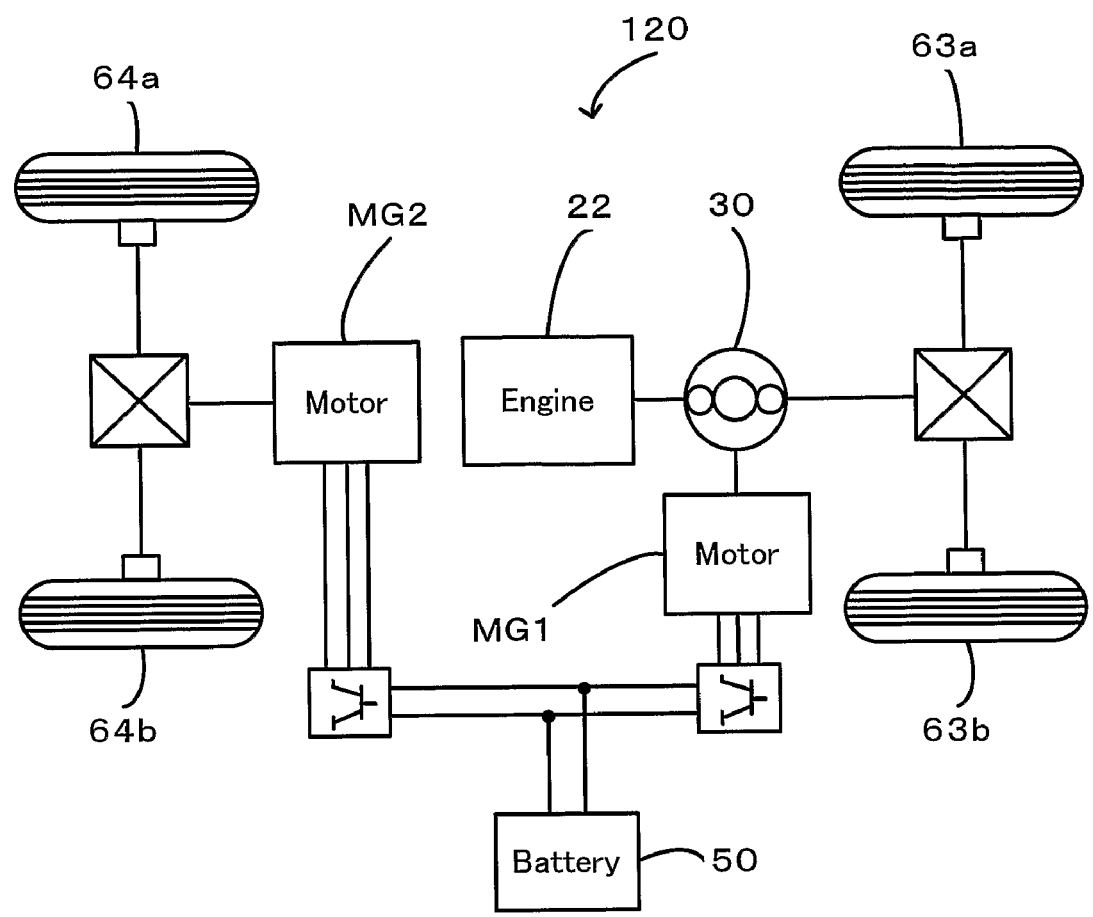
FIG. 6 schematically illustrates the configuration of another hybrid vehicle in one modified example.
Figure 7:
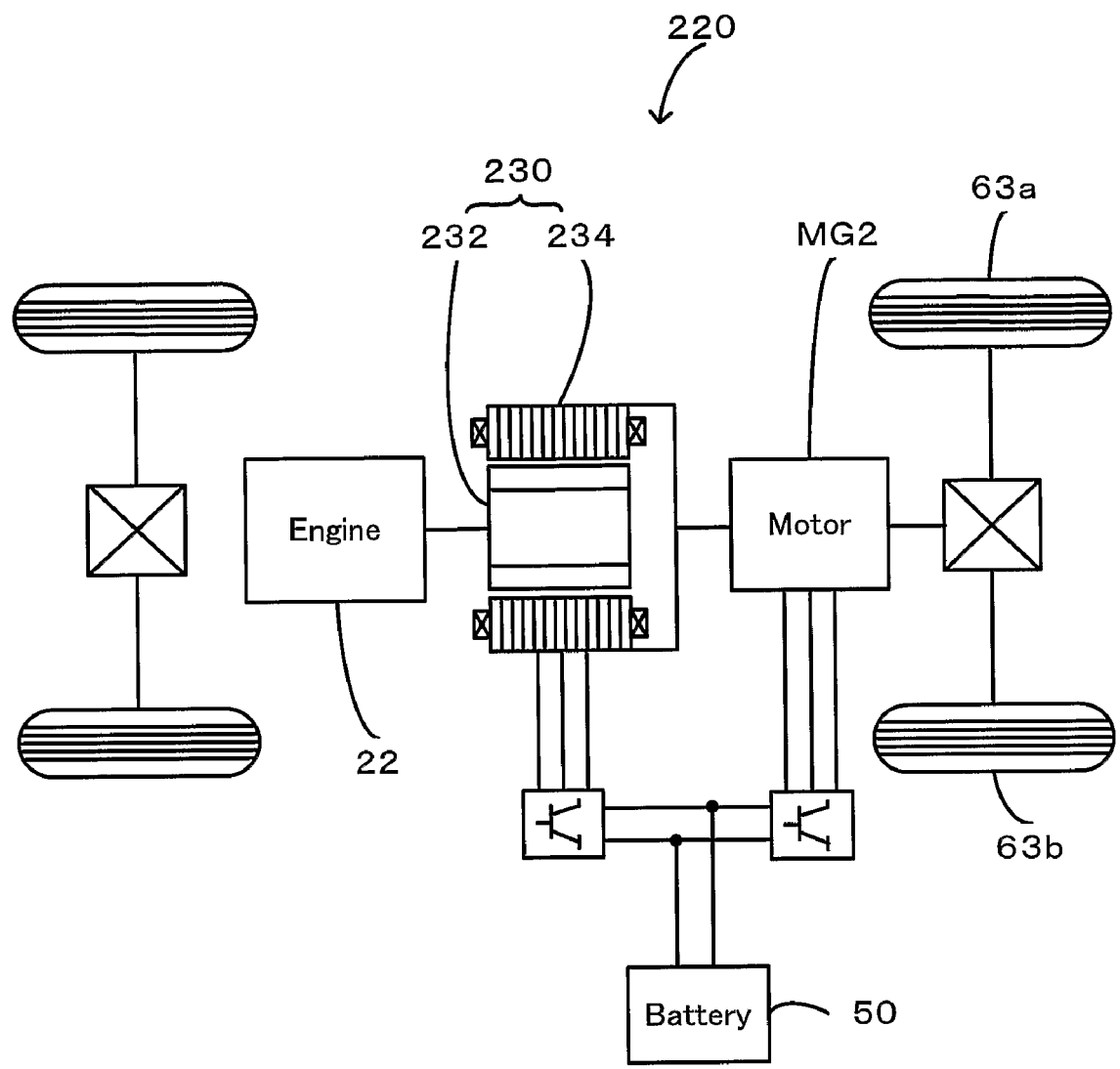
FIG. 7 schematically illustrates the configuration of still another hybrid vehicle in another modified example.

In the hybrid vehicle 20 of the embodiment, the power of the motor MG2 is output to the ring gear shaft 32a after torque conversion by the reduction gear 35. The technique of the invention is, however, not restricted to the hybrid vehicle of this configuration but may be applied to a hybrid vehicle 120 of a modified configuration shown in FIG. 6, where the power of the motor MG2 is transmitted to a different axle (an axle linked to wheels 64a and 64b) from the axle connecting with the ring gear shaft 32a (that is, the axle linked to the drive wheels 63a and 63b). In the hybrid vehicle 20 of the embodiment, the power of the engine 22 is output via the power distribution integration mechanism 30 to the ring gear shaft 32a or the drive shaft linked to the drive wheels 63a and 63b. The technique of the invention is also applicable to a hybrid vehicle 220 of another modified configuration that has a pair-rotor motor 230 as shown in FIG. 7. The pair-rotor motor 230 includes an inner rotor 232 connected to the crankshaft 26 of the engine 22 and an outer rotor 234 connected to the drive shaft of outputting power to the drive wheels 63a and 63b. Part of the output power of the engine 22 is transmitted to the drive shaft, while the residual part of the engine output power is converted into electric power. The technique of the invention may be adopted in a motor vehicle of any configuration that has an engine to output power for driving the motor vehicle, allows intermittent operation of the engine, and is equipped with an air conditioning system that heats the passenger compartment with the engine as a heat source. The engine performs the load operation when the operation of the engine is required for heating by the air conditioning system.

The embodiment and its modified examples discussed above are to be considered in all aspects as illustrative and not restrictive. There may be many other modifications, changes, and alterations without departing from the scope or spirit of the main characteristics of the present invention.

INDUSTRIAL APPLICABILITY

The technique of the invention is preferably applied to automobile manufacturing industry.

The invention claimed is:

1. A motor vehicle, comprising:
an internal combustion engine that outputs driving power used for driving said motor vehicle;
a generator that consumes the output power of the internal combustion engine and generates electric power;
an accumulator that is chargeable with the electric power generated by the generator;
a heating system that heats a passenger compartment of said motor vehicle with the internal combustion engine as a heat source and sets on and off a heating drive request as a drive request of the internal combustion engine, based on the temperature of the internal combustion engine; and
a control device comprising a power drive request setting module and a control module,
said power drive request setting module sets on and off a power drive request as another drive request of the internal combustion engine, based on a preset vehicle power demand including the driving power,
in a power drive request state where the power drive request is set on by said power drive request setting module, said control module controlling the internal combustion engine and the generator to make the internal combustion engine output a power corresponding to the preset vehicle power demand,
in a heating drive request state where the power drive request is set off by said power drive request setting module but the heating drive request is set on by the heating system, said control module controlling the internal combustion engine and the generator to start load operation of the internal combustion engine, and
in a non-request state where both the power drive request and the heating drive request are set off by said power drive request setting module and by the heating system, said control module controlling the internal combustion engine and the generator to stop operation of the internal combustion engine.

2. A motor vehicle in accordance with claim 1, wherein said control module controls the internal combustion engine and the generator to charge the accumulator simultaneously with the load operation of the internal combustion engine in the heating drive request state.

3. A motor vehicle in accordance with claim 1, wherein said control module increases a charge demand of the accumulator to start the load operation of the internal combustion engine in the heating drive request state.

4. A motor vehicle in accordance with claim 1, wherein said control module controls the internal combustion engine and the generator to charge the accumulator to a preset first charge level as an upper limit in the power drive request state and in the non-request state, while controlling the internal combustion engine and the generator to charge the accumulator to a higher charge level than the preset first charge level as the upper limit in the heating drive request state.

5. A motor vehicle in accordance with claim 1, said motor vehicle further comprising:
a motor that outputs driving power used for driving said motor vehicle,
wherein the accumulator is dischargeable to supply electric power to the motor, and
said control module controls the internal combustion engine, the motor, and the generator to make the internal combustion engine output the power corresponding to the preset vehicle power demand and to ensure output of the driving power in the power drive request state,
said control module controlling the internal combustion engine, the motor, and the generator to start the load operation of the internal combustion engine and to ensure output of the driving power in the heating drive request state,
said control module controlling the internal combustion engine, the motor, and the generator to stop the operation of the internal combustion engine and to ensure output of the driving power in the non-request state.

6. A motor vehicle in accordance with claim 5, wherein said control module controls the internal combustion engine, the motor, and the generator to cause at least part of the output power of the internal combustion engine under the load operation in the heating drive request state to be used as the driving power.

7. A motor vehicle in accordance with claim 5, wherein said control module controls the internal combustion engine, the motor, and the generator to charge the accumulator simultaneously with the load operation of the internal combustion engine in the heating drive request state.

8. A motor vehicle in accordance with claim 5, wherein said control module increases a charge demand of the accumulator to start the load operation of the internal combustion engine in the heating drive request state.

9. A motor vehicle in accordance with claim 5, wherein said control module controls the internal combustion engine, the motor, and the generator to charge the accumulator to a preset first charge level as an upper limit in the power drive request state and in the non-request state, while controlling the internal combustion engine, the motor, and the generator to charge the accumulator to a higher charge level than the preset first charge level as the upper limit in the heating drive request state.

10. A motor vehicle in accordance with claim 5, said motor vehicle further comprising:
a three shaft-type power input output mechanism that is linked to three shafts, that is, an output shaft of the internal combustion engine, a drive shaft connecting with an axle of said motor vehicle, and a rotating shaft of the generator, and automatically inputs and outputs power from and to a residual one shaft based on powers input from and output to any two shafts among the three shafts.

11. A motor vehicle in accordance with claim 10, wherein the motor is linked to output the power to the axle connecting with the drive shaft or to another axle of said motor vehicle.

12. A motor vehicle in accordance with claim 5, wherein the generator is a pair-rotor generator that has a first rotor linked to an output shaft of the internal combustion engine and a second rotor linked to a drive shaft connecting with an axle of said motor vehicle and is driven to rotate through relative rotation of the first rotor to the second rotor.

13. A motor vehicle in accordance with claim 12, wherein the motor is linked to output the power to the axle connecting with the drive shaft or to another axle of said motor vehicle.

14. A control method of a motor vehicle, said motor vehicle comprising: an internal combustion engine that outputs driving power used for driving said motor vehicle; a generator that consumes the output power of the internal combustion engine and generates electric power; an accumulator that is chargeable with the electric power generated by the generator; and a heating system that heats a passenger compartment of said motor vehicle with the internal combustion engine as a heat source, in the presence of a drive request of the internal combustion engine to satisfy a preset vehicle power demand including the driving power, said control method controlling the internal combustion engine and the generator to make the internal combustion engine output a power corresponding to the preset vehicle power demand, in the absence of the drive request of the internal combustion engine to satisfy the preset vehicle power demand but in the presence of a drive request of the internal combustion engine to activate the heating system based on the temperature of the internal combustion engine, said control method controlling the internal combustion engine and the generator to start load operation of the internal combustion engine, and in the absence of the drive request of the internal combustion engine to satisfy the preset vehicle power demand and in the absence of the drive request of the internal combustion engine to activate the heating system based on the temperature of the internal combustion engine, said control method controlling the internal combustion engine and the generator to stop operation of the internal combustion engine.

15. A control method of a motor vehicle in accordance with claim 14, said motor vehicle further comprising: motor that outputs driving power used for driving said motor vehicle; wherein said accumulator is dischargeable to supply electric power to the motor;

said control method controlling the internal combustion engine, the motor, and the generator to ensure output of the driving power.

* * * * *